(12) United States Patent
Lindberg et al.

(10) Patent No.: US 10,850,954 B2
(45) Date of Patent: Dec. 1, 2020

(54) HOISTING MACHINE ARRANGEMENT AND METHOD FOR PREPARING GEAR THEREOF

(71) Applicant: KONECRANES GLOBAL CORPORATION, Hyvinkää (FI)

(72) Inventors: Teppo Lindberg, Nuppulinna (FI); Jussi Puhakka, Espoo (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 10 days.

(21) Appl. No.: 15/116,775

(22) PCT Filed: Feb. 6, 2015

(86) PCT No.: PCT/FI2015/050077
§ 371 (c)(1),
(2) Date: Aug. 4, 2016

(87) PCT Pub. No.: WO2015/118229
PCT Pub. Date: Aug. 13, 2015

(65) Prior Publication Data
US 2016/0347591 A1    Dec. 1, 2016

(30) Foreign Application Priority Data

Feb. 7, 2014    (FI) ..................... 20145122

(51) Int. Cl.
*B66D 1/14*    (2006.01)
*B66D 1/12*    (2006.01)
*F16H 57/00*   (2012.01)

(52) U.S. Cl.
CPC .............. *B66D 1/14* (2013.01); *B66D 1/12* (2013.01); *F16H 57/00* (2013.01)

(58) Field of Classification Search
CPC .... B66D 1/14; B66D 1/12; B66D 1/16; F16H 57/00; F16H 1/06; F16H 1/26; F16H 57/0018; F16H 57/0025; F16H 57/0031
See application file for complete search history.

(56) References Cited

U.S. PATENT DOCUMENTS

| 927,200 | A | * | 7/1909 | Wick | ................. | B66D 1/14 254/342 |
| 1,315,970 | A | * | 9/1919 | King | ................. | B66D 1/14 192/215 |

(Continued)

FOREIGN PATENT DOCUMENTS

| DE | 701034 C | * | 1/1941 | ............... B66D 1/14 |
| DE | 701034 C1 |   | 1/1941 |

(Continued)

OTHER PUBLICATIONS

Espacenet.com, translation of DE 701034 C, uploaded Mar. 28, 2018 (Year: 2018).*

(Continued)

*Primary Examiner* — Sang K Kim
*Assistant Examiner* — Nathaniel L Adams
(74) *Attorney, Agent, or Firm* — Birch, Stewart, Kolasch & Birch, LLP

(57) ABSTRACT

A hoisting machine arrangement includes a rope drum, which has a driven gearwheel; a hoisting motor for driving the rope drum; and a gear between the hoisting motor and the rope drum. The gear has a body and a driving gearwheel, the driving gearwheel of the gear being coupled to the driven gearwheel of the rope drum. The body of the gear has a first drilling, which is arranged for fitting a shaft of the driving gearwheel; and a second drilling, which is parallel to the first drilling and arranged for fitting a shaft of the rope drum or (Continued)

the like. A method is disclosed for preparing a gear of a hoisting machine arrangement of this type.

5 Claims, 5 Drawing Sheets

(56) References Cited

U.S. PATENT DOCUMENTS

| | | | | |
|---|---|---|---|---|
| 1,790,243 | A | * | 1/1931 | Nilson .................... B66D 1/14 254/337 |
| 3,265,362 | A | * | 8/1966 | Moody .................... B66D 1/14 254/343 |
| 3,440,896 | A | * | 4/1969 | Jones ....................... B66D 1/14 74/413 |
| 3,698,690 | A | * | 10/1972 | Beaver .................... B66D 1/08 188/69 |
| 3,766,795 | A | | 10/1973 | Priest et al. |
| 4,433,755 | A | * | 2/1984 | Ohtomi ................... B66D 1/14 187/254 |
| 5,295,413 | A | | 3/1994 | Sherman |
| 6,910,678 | B2 | * | 6/2005 | Small ...................... B66D 1/28 254/334 |
| 2003/0205703 | A1 | | 11/2003 | McCormich et al. |
| 2012/0267592 | A1 | | 10/2012 | Zhao et al. |

FOREIGN PATENT DOCUMENTS

| | | |
|---|---|---|
| DE | 9421601 U1 | 5/1996 |
| DE | 102008052547 A1 | 4/2010 |
| EP | 0511486 A1 | 11/1992 |
| GB | 452301 A | 8/1936 |
| GB | 1254787 A | 11/1971 |
| GB | 2126315 A | 3/1984 |

OTHER PUBLICATIONS

European Office Action for European Application No. 15746655.8, dated Jun. 21, 2018.

* cited by examiner

HOISTING MACHINE ARRANGEMENT AND METHOD FOR PREPARING GEAR THEREOF

FIELD OF THE INVENTION

The invention relates to a hoisting machine arrangement comprising a rope drum, which has a driven gearwheel; a hoisting motor for driving the rope drum; and a gear between the hoisting motor and the rope drum, the gear having a body and a driving gearwheel, the driving gearwheel of the gear being coupled to the driven gearwheel of the rope drum. The invention also relates to a method for preparing a gear of a hoisting machine arrangement of this type.

A driving gearwheel of a gear is usually coupled to a gearwheel of a rope drum using methods that require aligning work in the mounting phase for setting proper shaft angles (minimizing angular error) and distances between the gearwheels. In other words, an extra branch to be separately mounted between the gear and the drum is prepared, the branch being provided with a precise surface, i.e. a hole for a shaft extension, to which the axial line of the rope drum is adjusted.

Consequently, the alignment of the shafts of interconnecting gearwheels and setting the shafts at precisely the right distance from another becomes laborious, and requires additional components as shown above. Despite these measures, the shafts and the gearwheels arranged to them do not necessarily set into the right position and location in relation to one another, and thus the gearwheels wear out rapidly. Moreover, changing replacement parts in the assembly takes time because each adjustment must be made individually on the installation site.

SUMMARY OF THE INVENTION

An object of the invention is thus to provide a hoisting machine arrangement and method for preparing a gear thereof so as to enable the aforementioned problems to be solved.

This is achieved by a hoisting machine arrangement of the invention, which is characterized in that the gear body has a first drilling, which is arranged for fitting a shaft of the driving gearwheel, and a second drilling, which is parallel to the first drilling and arranged for fitting a shaft of the rope drum, a shaft seating attached to the shaft or a shaft extension at an end of the rope drum.

The method is characterized by making a first drilling to the gear body for fitting a shaft of the driving gearwheel, and a second drilling parallel to the first drilling for fitting a shaft of the rope drum, a shaft seating attached to the shaft or a shaft extension at an end of the rope drum.

A particular advantage of the method is that the first and the second drilling are made in one and the same machining device with the same fastening without detaching between the drillings the gear body or a part of the body to which the drillings are to be made from the fastening made for the machining.

In other words, the invention is based on the idea that drillings to the gear body or a part of the body are made both to the shaft of the driving gearwheel and the shaft of the rope drum, or the like. It is thus easy to obtain identical axial lines and correct centre distances, and hence also a correct tooth contact for the gearwheels. The gearwheels now wear in an ordinary manner and abnormal elements from the sound the system makes when running are eliminated. Clutches, intermediate fittings or aligning work are no longer needed in assembly and servicing, all that is required is mounting the parts in place. In the purchase chain each of the gear, the rope drum, and even the gearwheel for the rope drum, may be purchased from a different supplier specialized in their separate fields of expertise. This provides cost efficiency and, despite the different suppliers, it is easy to get the tooth contact in the power transmission of the assembly right.

LIST OF FIGURES

The invention is now described in closer detail by means of preferred embodiments and with reference to the accompanying drawings, in which.

DETAILED DESCRIPTION OF THE INVENTION

Figure 1:
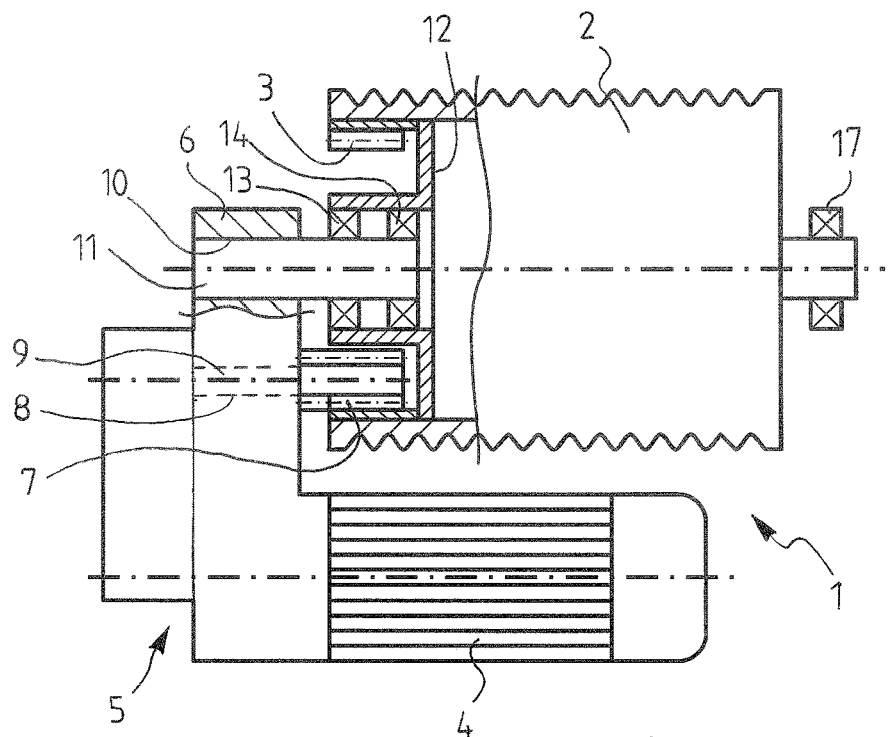
FIG. 1 is a partly sectional side view of a first embodiment of a hoisting machine arrangement of the invention.

Reference is first made to a hoisting machine arrangement 1 of the invention as shown in FIG. 1, the arrangement comprising a rope drum 2 with a driven gearwheel 3, a hoisting motor 4 for using the rope drum 2, and a gear 5 between the hoisting motor 4 and the rope drum 2. The gear 5 is provided with a body 6 and a driving gearwheel 7, which is coupled to the driven gearwheel 3 of the rope drum 2.

An essential aspect of this construction is that the body 6 of the gear has a first drilling 8, which is arranged for fitting a shaft 9 of the driving gearwheel 7, and a second drilling 10, which is parallel to the first drilling 8 and arranged for fitting a shaft of the rope drum 2, a shaft seating fastened to the shaft or a shaft extension at an end of the rope drum. A shaft extension 11 is used in all the examples shown.

The gear body 6 or the part of the body where the first and second drillings 8 and 10 are located is preferably a uniform piece.

To ensure that the shafts are set parallel and with a correct centre distance when the drillings 8 and 10 are being made, it is expedient to make the drillings 8 and 10 using one and the same machining device (not shown) and with one and the same fastening, without detaching between the drillings the gear body 6 or the part of the body where the drillings are to be made from the fastening. The internal precision specific to the machining device can thus be transferred to serve as the gearing precision by standard mechanical engineering methods without a need for a separate, more precise tolerance setting or manual adjusting between the individual gearing pieces.

In all the disclosed examples the shaft 9 of the driving gearwheel 7 and the shaft extension 11 preferably extend to the same side in relation to the gear 5.

The gearwheel 3 used in the embodiment of FIG. 1 is formed or fastened to an inner circumference of the rope drum 2, to the edge of the rope drum 2. On this side, i.e. on the side of the gear 5, the rope drum 2 is mounted on bearings to the rope drum shaft extension 11 fastened to the second drilling 10 of the gear body 6 by means of an end part 12, the bearing being accomplished by two bearings 13 and 14 one after the other that align the rope drum 2 with the gear 5.

Figure 2:
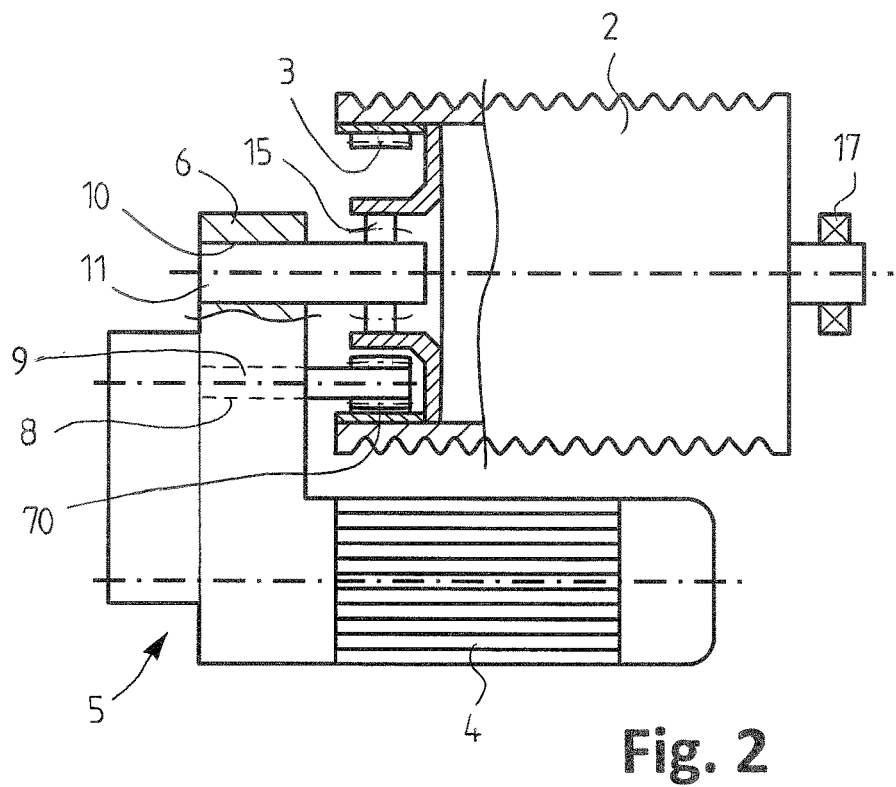
FIG. 2 is a partly sectional side view of a second embodiment of a hoisting machine arrangement of the invention.

FIG. 2 shows an example that differs from the one in FIG. 1 in that the rope drum 2 is mounted on bearings to the shaft extension 11 by one bearing 15 which is on the centre line of the pair formed by the driven gearwheel 3 and the driving gearwheel 70, when seen in a radial direction of the gearwheels. Moreover, since the teeth of the driving gearwheel 70, as seen in their radial direction, are provided with a suitable curved top surface, this solution allows for a small deviation of the axial line of the rope drum 2 from the line determined by the shaft 9 of the driving gearwheel 70 of the shaft extension 11.

Figure 3:
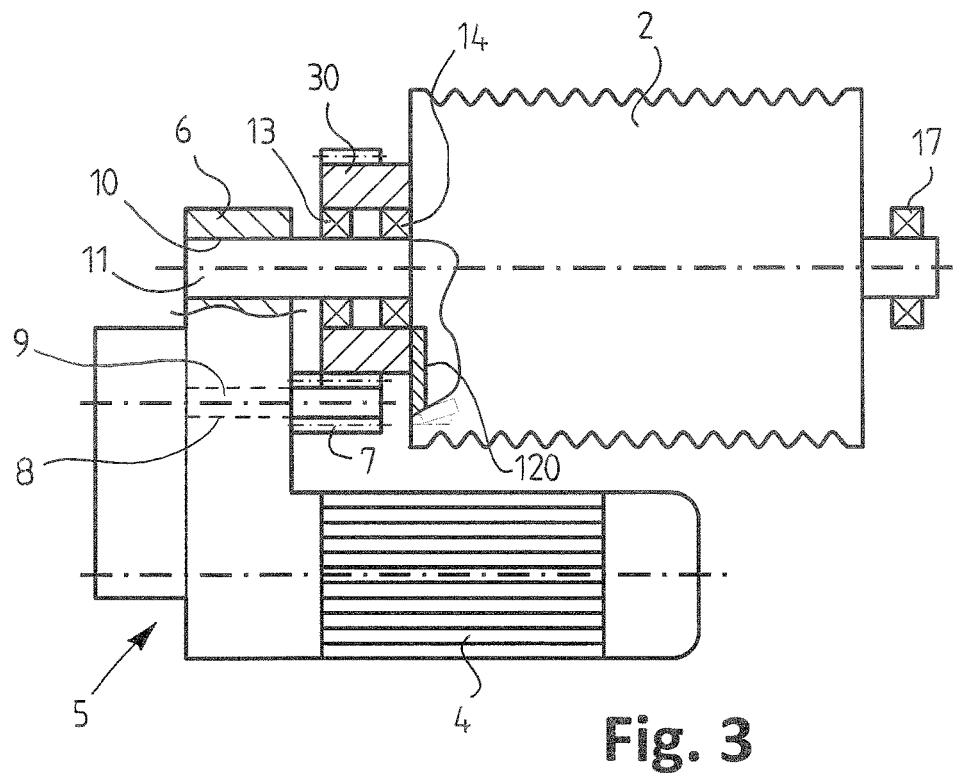
FIG. 3 is a partly sectional side view of a third embodiment of a hoisting machine arrangement of the invention.

The solution shown in FIG. 3 differs from the one in FIG. 1 in that the driven gearwheel 30 is fastened to an end part 120 on a side of the rope drum 2, and the shaft extension 11 of the rope drum is mounted on bearings directly to the driven gearwheel 30 by two bearings 13 and 14 one after the other, such as those in FIG. 1.

Figure 4:
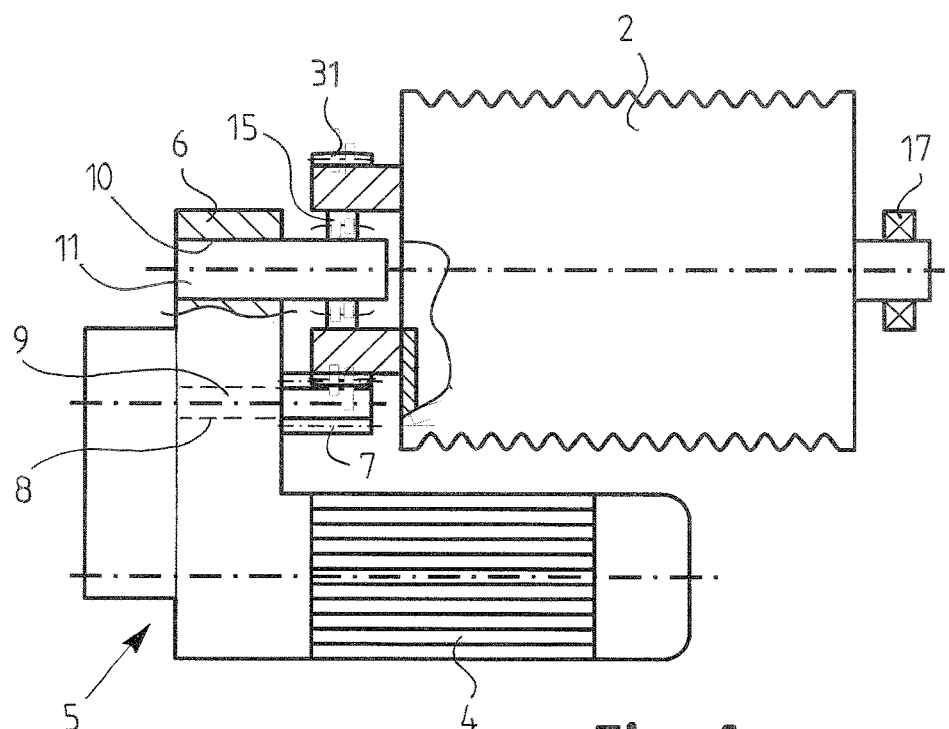
FIG. 4 is a partly sectional side view of a fourth embodiment of a hoisting machine arrangement of the invention.

The embodiment shown in FIG. 4 differs from the solution according to FIG. 3 in that the mounting on bearings of the rope drum 2 to the shaft extension 11 is implemented similarly as in the example of FIG. 3, i.e. by means of one bearing 15 located on the centre line of the pair formed by the driven gearwheel 31 and the driving gearwheel 7, when seen in the radial direction of the gearwheels. The teeth of the gearwheel 31 used here are provided with a curved top surface, when seen in their radial direction, so that a slight angular error from the line determined by the shaft extension 11 and the shaft of the driving gearwheel 7 is allowed in the axial line of the rope drum 2.

Figure 5:
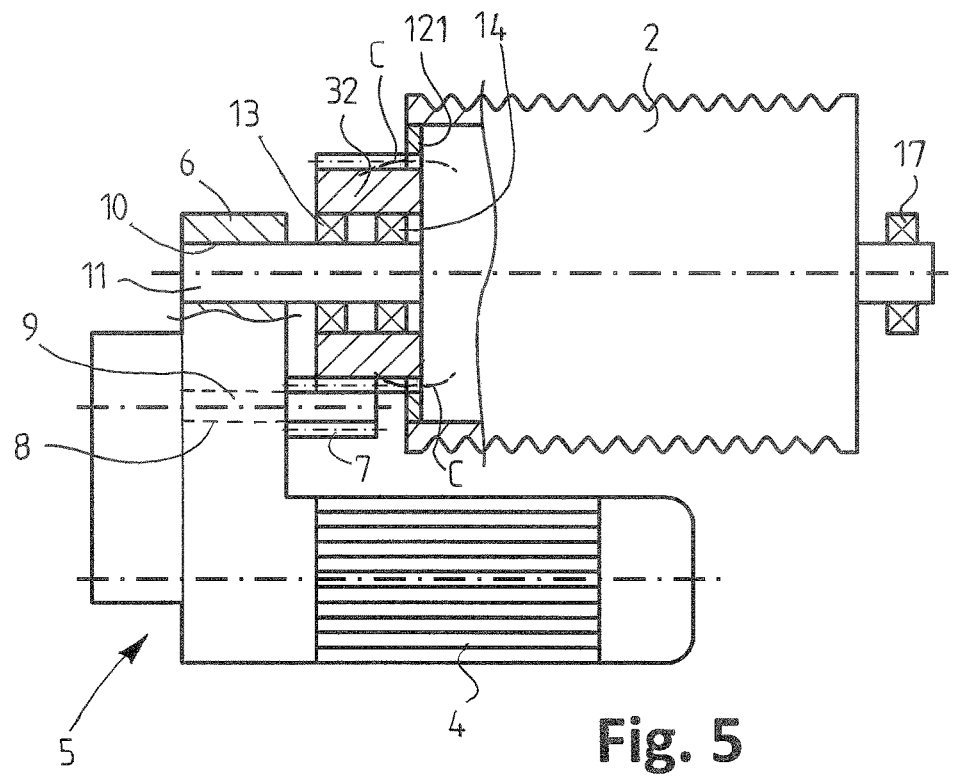
FIG. 5 is a partly sectional side view of a fifth embodiment of a hoisting machine arrangement of the invention.

FIG. 5 shows an alternative that differs from the solution shown in FIG. 3 in that the driven gearwheel 32 is coupled to an end part 121 of the rope drum by the teeth of the gearwheel. The gearwheel 32 is fastened to the rope drum 2 so as to allow the angle formed by them to vary a little with regard to alignment. Curved lines C depict a flexible drum-gearwheel coupling. The coupling may transmit the used torque, yet allows at the same time a slight angular variation from the alignment.

Figure 6:
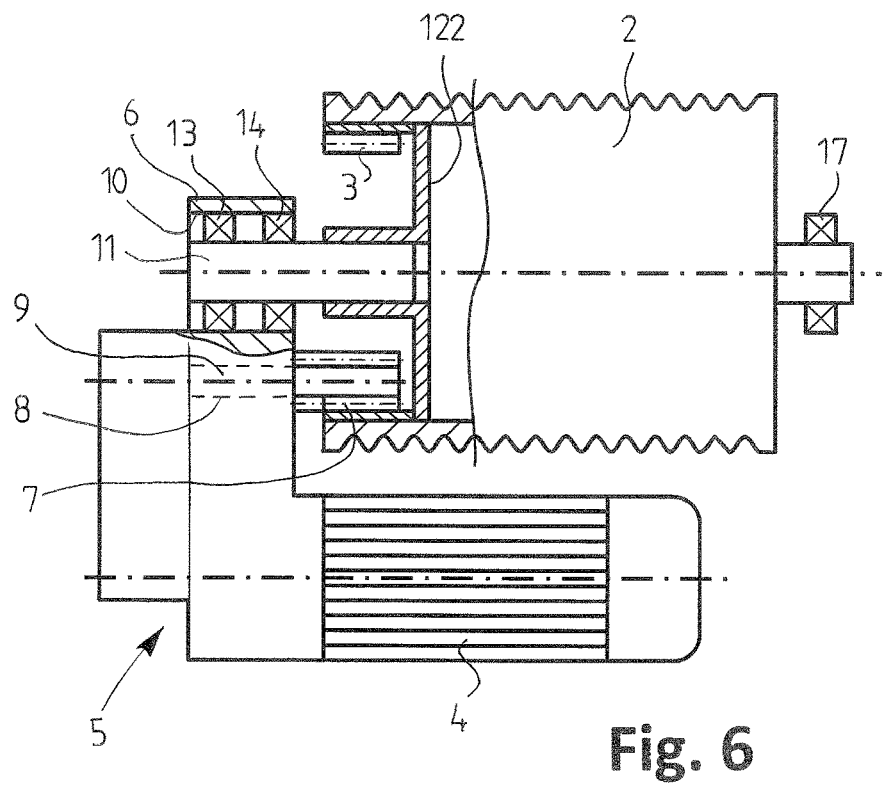
FIG. 6 is a partly sectional side view of a sixth embodiment of a hoisting machine arrangement of the invention.

FIG. 6 shows how the shaft extension 11 may, unlike in the implementation of FIG. 1, be fixedly located at an end part 122 of the rope drum 2, and the rope drum 2 may be mounted on bearings to the second drilling of gear 5 at the other end of this shaft extension 11. The examples according to FIGS. 3 and 5 may be modified similarly.

Figure 7:
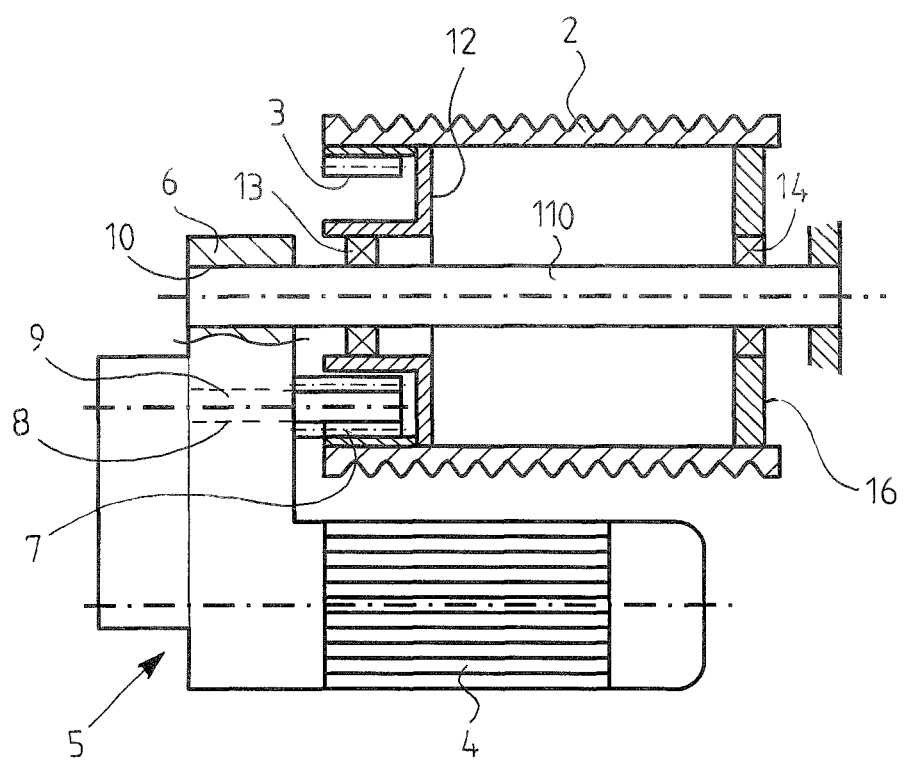
FIG. 7 is a partly sectional side view of a seventh embodiment of a hoisting machine arrangement of the invention.

FIG. 7 shows yet another modification of the solution of FIG. 1, in which a shaft 110 extending through the entire rope drum 2 is used, in particular in connection with short rope drums 2. In that case the rope drum 2 may be mounted on one bearing 13, 14 to the shaft 110 at both ends 12, 16 of the rope drum 2.

It is possible to provide a support between the rope drum 2 and the gear 5 in relation to the hoisting machine in different ways. In the examples according to FIGS. 1, 3 and 6 the support of the rope drum 2 is rigid, whereas the gear 5 is provided with a flexible support or supported by a projection. Correspondingly, in FIGS. 2, 4 and 5 the support of the gear 5 is rigid, whereas the rope drum 2 is provided with a flexible support or supported by a projection. Advantages of this solution are disclosed with reference to FIG. 5. Rigid support means support against gravity and/or applied torque, but it does not exclude the possibility of a floating bearing arrangement. A typical example of this is the bearing 17 of the rope drum 2 shown in FIGS. 1 to 6, which is on an opposite side of the rope drum 2 in relation to the gear 5.

Figure 9:
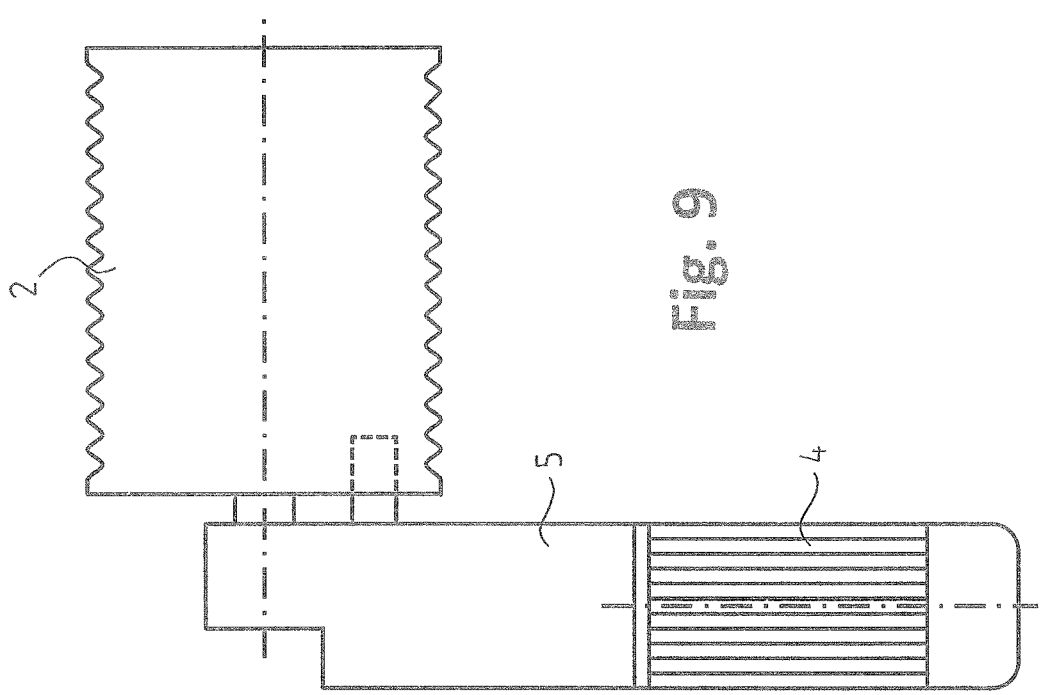
FIGS. 8 and 9 show alternative ways of positioning a hoisting motor in connection with a hoisting machine arrangement of the invention.
Figure 8:
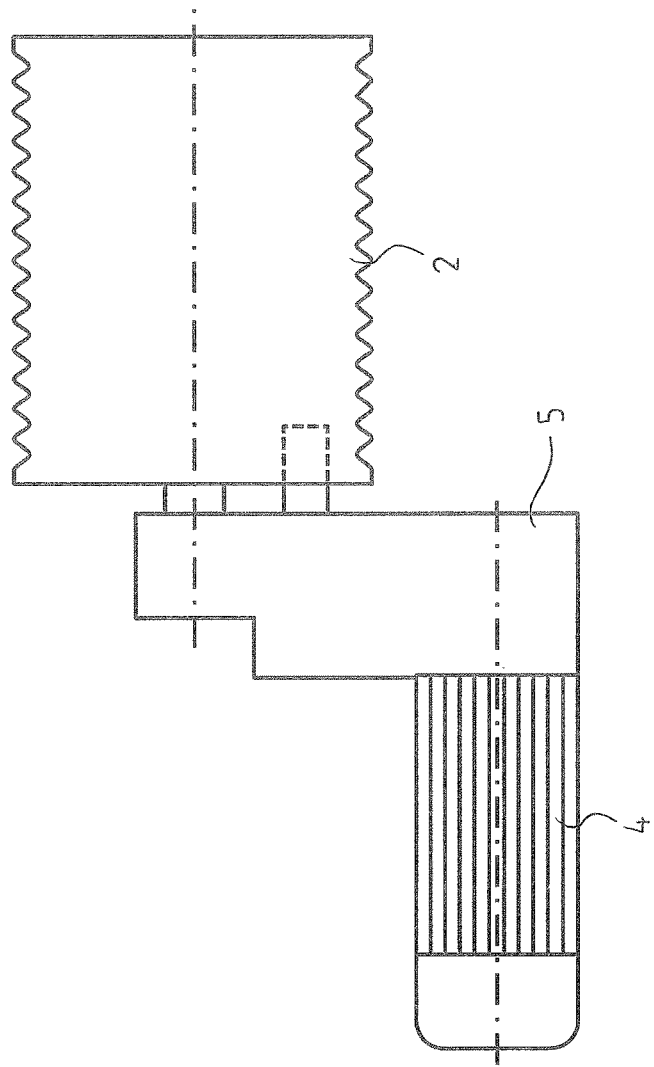

Finally, FIGS. 8 and 9 show alternative ways of positioning the hoisting motor 4, in addition to those shown in FIGS. 1 to 7. In FIG. 8 the hoisting motor 4 is located on a different side of the gear 5 in relation to the rope drum 2, the components in question thus being in a Z form. In FIG. 9 the hoisting motor is after the gear 5 and in line with it, so the rope drum 2, the gear 5 and the hoisting motor are in an L form.

In all the examples described above the gear 5 is typically a reduction gear with a housing for the first gearwheel pair or pairs (not shown). The gearwheel 7; 70 in the first drilling 8 of the gear 5 forms an open transmission in which the gearwheel or gearwheel circumference 3; 30; 31; 32 meshing with it is on the driven part of the machine, i.e. on the rope drum 2 in this case. To make the housing of the gear 5 smaller and to save on materials, it is advantageous that the axial line of the first drilling 8 is closer to the hoisting motor 4 than the axial line of the second drilling 10. The machine member (shaft) passing through the second drilling 10 is used to align the machine part on the "driven side", i.e. the "rearward side", of the open transmission in relation to the gear 5 and to the machine member (shaft) in its first drilling 8.

The above description of the invention is only intended to illustrate the basic idea of the invention. A person skilled in the art may thus vary its details within the scope of the attached claims.

The invention claimed is:

1. A hoisting machine arrangement comprising:
   a rope drum, which has a driven gearwheel;
   a hoisting motor for driving the rope drum; and
   a gear between the hoisting motor and the rope drum, the gear having a body and a driving gearwheel, the driving gearwheel of the gear being coupled to the driven gearwheel of the rope drum, wherein the gear body includes:
      a first drilling, which is arranged for fitting a shaft of the driving gearwheel; and
      a second drilling, which is parallel to the first drilling and arranged for fitting a portion of a shaft of the rope drum,
   wherein the driven gearwheel is formed or attached to the rope drum,
   wherein the driving gearwheel forms an open transmission in combination with the driven gearwheel, and
   wherein the rope drum includes an end part, the end part being directly mounted on two bearings located one after the other on the shaft of the rope drum to align the rope drum and the gear to obtain parallel axial lines of the shaft of the rope drum and the shaft of the driving gearwheel to provide a correct center distance between the shaft of the rope drum and the shaft of the driving gearwheel and a correct tooth contact for the driving gearwheel and the driven gearwheel.

2. The hoisting machine arrangement as claimed in claim 1, wherein the gear body or a part of the gear body where the first and second drillings are located is a single piece.

3. The hoisting machine arrangement as claimed in claim 1, wherein the shaft of the driving gearwheel and the portion of the shaft of the rope drum extend to the same side in relation to the gear.

4. The hoisting machine arrangement as claimed in claim 1, wherein the driven gearwheel is formed or fastened to an inner circumference of the rope drum or to an edge of the rope drum.

5. The hoisting machine arrangement as in claim 1, wherein a distance between the first and second drillings and their parallel orientation define a centre distance between the driving gearwheel and the rope drum.

\* \* \* \* \*